United States Patent
Leventhal et al.

(10) Patent No.: US 9,641,321 B1
(45) Date of Patent: May 2, 2017

(54) METHOD AND APPARATUS FOR THE VIRTUALIZATION OF CRYPTOGRAPHIC RESOURCES

(71) Applicants: David H Leventhal, Tucson, AZ (US); Robert F Barnitt, Paradise Valley, AZ (US)

(72) Inventors: David H Leventhal, Tucson, AZ (US); Robert F Barnitt, Paradise Valley, AZ (US)

(73) Assignee: DARK SIGNAL RESEARCH, LLC, Tucson, AZ (US)

( * ) Notice: Subject to any disclaimer, the term of this patent is extended or adjusted under 35 U.S.C. 154(b) by 359 days.

(21) Appl. No.: 14/533,231

(22) Filed: Nov. 5, 2014

(51) Int. Cl.
| | | |
|---|---|---|
| *G06F 3/00* | (2006.01) | |
| *H04L 9/06* | (2006.01) | |
| *G06F 21/74* | (2013.01) | |
| *H04L 9/08* | (2006.01) | |
| *G06F 12/14* | (2006.01) | |

(52) U.S. Cl.
CPC ........ *H04L 9/0637* (2013.01); *G06F 12/1408* (2013.01); *G06F 21/74* (2013.01); *H04L 9/0869* (2013.01); *G06F 2212/1052* (2013.01); *G06F 2212/402* (2013.01); *H04L 2209/34* (2013.01)

(58) Field of Classification Search
CPC .......... G06F 12/14; G06F 21/00; G06F 21/79; H04L 2209/122; H04L 2209/125; H04L 2209/80; H04L 9/0618; H04L 9/0637; H04L 9/0662
USPC ................ 713/190, 193; 726/22; 380/28, 37
See application file for complete search history.

(56) References Cited

U.S. PATENT DOCUMENTS

| | | | | |
|---|---|---|---|---|
| 9,342,705 | B1* | 5/2016 | Schneider ................ | H04L 9/14 |
| 2002/0044564 | A1* | 4/2002 | Ranta .................... | H04B 7/0617 370/436 |
| 2007/0110225 | A1* | 5/2007 | Leventhal ............ | H04L 9/0618 380/28 |
| 2007/0286415 | A1* | 12/2007 | Bertoni ................ | H04L 9/0631 380/37 |
| 2007/0286416 | A1* | 12/2007 | Bertoni ................ | H04L 9/0631 380/37 |

(Continued)

*Primary Examiner* — Joseph P Hirl
*Assistant Examiner* — Sayed Beheshti Shirazi
(74) *Attorney, Agent, or Firm* — Haverstock & Owens LLP; Thomas B. Haverstock

(57) ABSTRACT

A method and apparatus is provided for the virtualization of cryptographic resources which enables memory speed encryption and decryption that is not bound by the speed at which processor resources can compute the result of a symmetric-key algorithm. This is achieved through a time-memory tradeoff via empty space at provisioning time. When implementing the apparatus, un-initialized memory is filled with the output of a symmetric-key algorithm uniquely keyed for the specific set of data that is going to be written to the provisioned area. Since the provisioning operation stores cryptographically structured data, rather than redundant data, plaintext that is xor'ed into memory is automatically encrypted and ciphertext that xor'ed into memory is automatically decrypted without the need for additional cryptographic computation. This reduced computation requirement enables cryptographic function to be implemented at the ends of communication, rather than the middle, and treated as a virtualized resource.

11 Claims, 3 Drawing Sheets

(56) References Cited

U.S. PATENT DOCUMENTS

| | | | | |
|---|---|---|---|---|
| 2010/0262841 A1* | 10/2010 | Ekberg | .................. | G06F 21/645 713/193 |
| 2011/0103578 A1* | 5/2011 | Orlando | ................ | H04L 9/0637 380/28 |
| 2011/0239296 A1* | 9/2011 | Schipper | ................ | H04N 7/163 726/22 |
| 2014/0301546 A1* | 10/2014 | Chevallier-Mames | | H04L 9/0631 380/28 |

* cited by examiner

METHOD AND APPARATUS FOR THE VIRTUALIZATION OF CRYPTOGRAPHIC RESOURCES

FIELD OF THE INVENTION

This invention relates to the virtualization of cryptographic encoding and decoding when operating a symmetric-key algorithm for confidentiality.

BACKGROUND OF THE INVENTION

Storage and network virtualization are fundamental cloud enabling technologies. Storage and network virtualization does to storage and networking what server virtualization did to servers. They take the fundamental components that constitute storage and networking and virtualize them so that multiple virtual storage systems and networks can be multiplexed onto a single set of physical hardware.

The virtualization of cryptographic functions enables the separation of cryptographic computation from the time of a storage or network encryption or decryption event. The invention facilitates this by consuming memory resources in order to time shift computation, therefore creating a new cryptographic virtualization or resource which is tightly coupled with the memory system.

Treating cryptographic computation as a virtual resource enables the application level to handle the encryption and decryption of information by providing a fast way to encode and decode. In this manner, end-to-end encryption of data can be realized, possibly changing the paradigm of confidentiality on current storage and networking systems which are dependent on physical hardware.

The end-to-end argument has been debated in computer science since "End-to-End Arguments in System Design" [1] was put forward in the early 1980s as a central design principle of the Internet. As the Internet matured, block ciphers were often moved into hardware in order to support the throughput requirements present in network communications and storage. This was done via specialized routers capable of encrypting and decrypting packets at wire speed and storage controllers capable of encrypting and decrypting at disk access speed. This paradigm meant encryption and decryption was often in the middle, not at the ends.

Another force driving this line of thought was the sheer fact that each end of communication could not provide adequate rates of encryption and decryption because they were often personal computers or larger computers whose computational bandwith was exhausted due to the demands of multiprocessing.

As the years progressed and processors became powerful enough to execute algorithms such as the Data Encryption Standard (DES), some of the security was moved to the endpoints even though a performance bottle neck would often be created. The goal was to increase the speed of software encryption and eventually a change in the standardized algorithm would move things closer to that goal. As the utilization of the Advanced Encryption Standard (AES) [2] became commonplace, the race to make a software implementation that could keep up with throughput demands was on.

Eventually hardware instructions were added to general purpose processors in the server environment in order to support end-to-end protocols including TLS. While these processors could keep up at times, they would often get saturated performing the computation necessary from multiple high bandwidth links. The invention was conceived to support high bandwidth operations without the need to couple all operations with the processor complex at the time of encryption or decryption. Virtual cryptographic services perform the encryption and decryption needed by servers as an abstraction that exists on top of physical hardware.

A key hardware trend that enables the virtualization of encryption and decryption is the improvements we are seeing in PC and server memory systems. In modern computing, memory that is relatively inexpensive and fast can be used to improve performance in many different aspects. Memory is not as scarce of a resource as it has been in the past and it is in this extra memory where cryptographic virtualization is realized. Using a virtual cryptographic resource is not dependent on available processor bandwidth but rather on available memory bandwidth.

SUMMARY OF THE INVENTION

First we will define virtualization, and then the difference between an actual cryptographic device and a virtual one. The common definition of virtualization in computing refers to the act of creating a virtual, rather than actual, version of something; this includes but is not limited to a virtual computer hardware platform, operating system, storage device, or computer network resource. In summary, a virtual version of something has equivalent logical function but is a virtual construct in memory.

An actual cryptographic device is capable of computing a symmetric-key algorithm and therefore capable of encoding and decoding data. This is typically a general purpose processor running cryptographic software, a general purpose processor with hardware assistance for cryptographic calculations, or a specialized piece of hardware. A virtual cryptographic device is capable of equivalently encoding and decoding data, but it is a memory construct that is logically constructed and deconstructed.

Physical resources are typically bound in function to the actual hardware of which they are composed. In cryptographic terms this is the speed at which a processor can compute a symmetric-key algorithm. When cryptographic functions are virtualized, such as with the invention, they are only limited by the speed at which memory can be accessed and therefore support a finer grain of resource control.

Due to this greater resource control, we are able to support end-to-end encryption no matter what the definitions of the ends. In "The End-To-End Argument and Application Design: The Role Of Trust" [3] the authors postulate that the best definition of ends has to do with trust, and not logical or physical location. This line of thinking is aligned with the confidentiality that symmetric-key algorithms provide since both parties communicating need to trust each other.

By definition, data in a general computing system ends up in memory and is acted upon by the processor when it becomes of interest to the problem at hand. Since the invention is a memory construct, it is conveniently present as the state of data changes as dictated by the processor. In general, data needs to be decrypted when in use and encrypted when not in use. The application level is a likely place to dictate this since it decides when and how data is used. This is the paradigm we are proposing for the optimal use of the invention.

Sometimes the application level is defined as primitives in an operating system or hypervisor. These types of systems often have the need to move large amounts of data throughout the data center in short order. They can use the invention to encrypt or decrypt system or user data or entire virtual machines along with any application or data they are using as needed.

When encoding a plaintext after it goes out of use, it makes sense to perform a time-memory tradeoff, as taught by Leventhal et al in US2007/0110225, taking advantage of excess memory to speed up processor operations. For the invention, a cryptographic cache of data generated during the provisioning operation is maintained in memory that would otherwise go unutilized.

When decoding a ciphertext that comes into use, it also makes sense to perform a time-memory tradeoff, as taught by Leventhal et al in US2007/0110225, taking advantage of excess memory to speed up processor operations.

The high performance encrypt and decrypt operations of the invention are enabled by hiding the speed or computational limits of a processor that is tasked to execute a symmetric-key algorithm behind a cache. This is the same strategy that the microprocessor and storage industries use to speed up a variety of devices. For example, in the microprocessor space SRAM processor caches are used to hide the relatively slower speed of DRAM, and in the storage space solid-state memory caches are used to hide the relatively slower speed of mechanical disks.

In the invention, caching or trading space for time is used to address cryptographic performance. Cryptographic caches blend the substantial difference between the rate at which the processor can perform symmetric-key algorithm and memory speed through the use of precomputed keystreams, thereby creating a higher burst throughput rate for encoding and decoding.

The invention shares common function as taught by Leventhal et al in US2014/0157005, the main differences being that it supports both fast encryption and decryption, with their corresponding store operations respectively, and does not deduplicate data.

In particular, a ciphertext store is performed when a ciphertext residing in memory is xor'ed into a cryptographic memory allocation with a resulting plaintext becoming available for data operations. In this manner, a cryptographic memory allocation supports both the encryption of a plaintext (plaintext store) and decryption of a ciphertext (ciphertext store), the only difference being the state of the data once it is stored to the allocated memory area.

A cryptographic memory allocation is any memory allocation whose eventual use will be to store a plaintext or ciphertext. It is similar to the cryptographic virtual disk as taught by Leventhal et al in US2014/0157005 in that it is initialized with a keystream, but differs in the fact that can stores both a ciphertext and a plaintext and provides support for accelerated store operations no matter which direction the symmetric cipher is being operated.

Another fundamental difference between the invention and the methods taught by Leventhal et al in US2014/0157005 is the fact that the methods taught by Leventhal et al in US2014/0157005 are used in a write once read many (WORM) disk, which has its primary utility in snapshots and backup, while the invention can be used anywhere there is a need for high throughput encryption and decryption provided certain security measures are taken concerning the use of keystreams.

With a WORM disk, security was established because the keystream residing on the virtual disk was written over with ciphertext once the plaintext became available. In this manner the disk always contained ciphertext so the "read many" operation was slow due to decoding not having the benefit of the precomputed keystream. With the invention, there are two types of data that end up residing in a cryptographic memory allocation. The first is a ciphertext generated from a plaintext that was added using the store operation. The second is plaintext generated from a ciphertext that was added using the store operation.

From an end-to-end perspective the invention has to be used in a manner where the presence of the keystream does not expose a ciphertext before it is logically safe to do so. For example, on the encoding side the keystream is consumed when a plaintext becomes present and only the ciphertext remains. This would obviously have to be used in a model where the existence of the expanded key or keystream prior to the encryption event does not put the ciphertext in jeopardy. For example, a cryptographic memory allocation could not be used as a general purpose local storage device but could be used to encode and decode data on two ends of a network transmission or on a set of data that was bound for a different compute complex.

The invention also has an advantage over other encoding methods if AES was ever to be broken or fall out of favor since any investment in hardware instructions that supported a certain bandwidth would be lost and the slack would need to be taken up. The fact that the invention operates with any symmetric-key algorithm and that its encoding and decoding speed is independent of that algorithm would be highly beneficial in this case.

BRIEF DESCRIPTION OF THE DRAWINGS

The accompanying drawings illustrate embodiments of the invention and, together with the description, serve to explain the principles of the invention. The applications disclosed are for illustrative purposes only, and are not meant to restrict the scope of the present invention. Embodiments in accordance with the present invention are relevant to all types of data.

DETAILED DESCRIPTION OF THE PREFERRED EMBODIMENTS

In order to illustrate the invention, we will treat a cryptographic memory allocation as a dynamic resource supported by an operating system or hypervisor or at the application level. Therefore the application that utilizes the invention is responsible for intelligent memory allocation and the protection of encoded data by not storing the keystream on the same device that encoded data resides in for obvious reasons. We will divide the operation of the invention as a system into its corresponding provision, plaintext store, and ciphertext store methods or operations. We will also separate the encoding operation which is coupled with the plaintext store method, and the decoding operation which is coupled with the ciphertext store method.

In order to illustrate the provision method of the invention, we will use AES as an example symmetric-key algorithm, with a 256-bit key and a 128-bit block size, operating in counter mode (CTR) with a 96-bit nonce and 32-bit counter function as taught by Leventhal et al in US2014/0157005. The selection and use of AES-CTR in the following descriptions and examples is not meant to restrict the provision method of the present invention in any manner. It should be known that the present invention can be implemented with any block cipher using a key or block size comprising any number of bits. Also, any reasonable scheme for generating and concatenating nonce and counter values comprising any number of bits can be used as long as each nonce and counter value concatenation is unique per block generated. For example, on a 64-bit operating system it may be desirable to make the counter 64-bits rather than 32-bits.

All references to memory in the following descriptions of the preferred embodiments should be understood to imply a combination of processor cache and primary storage. We will define processor cache as memory, which is located on the physical processor, and primary storage as fast memory that is tightly coupled to the processor such as high-speed cache or Random Access Memory (RAM). It should be noted that secondary storage defined as slower memory that is more loosely coupled to the processor such as a solid state drive can also be considered primary storage in some cases.

Figure 1:
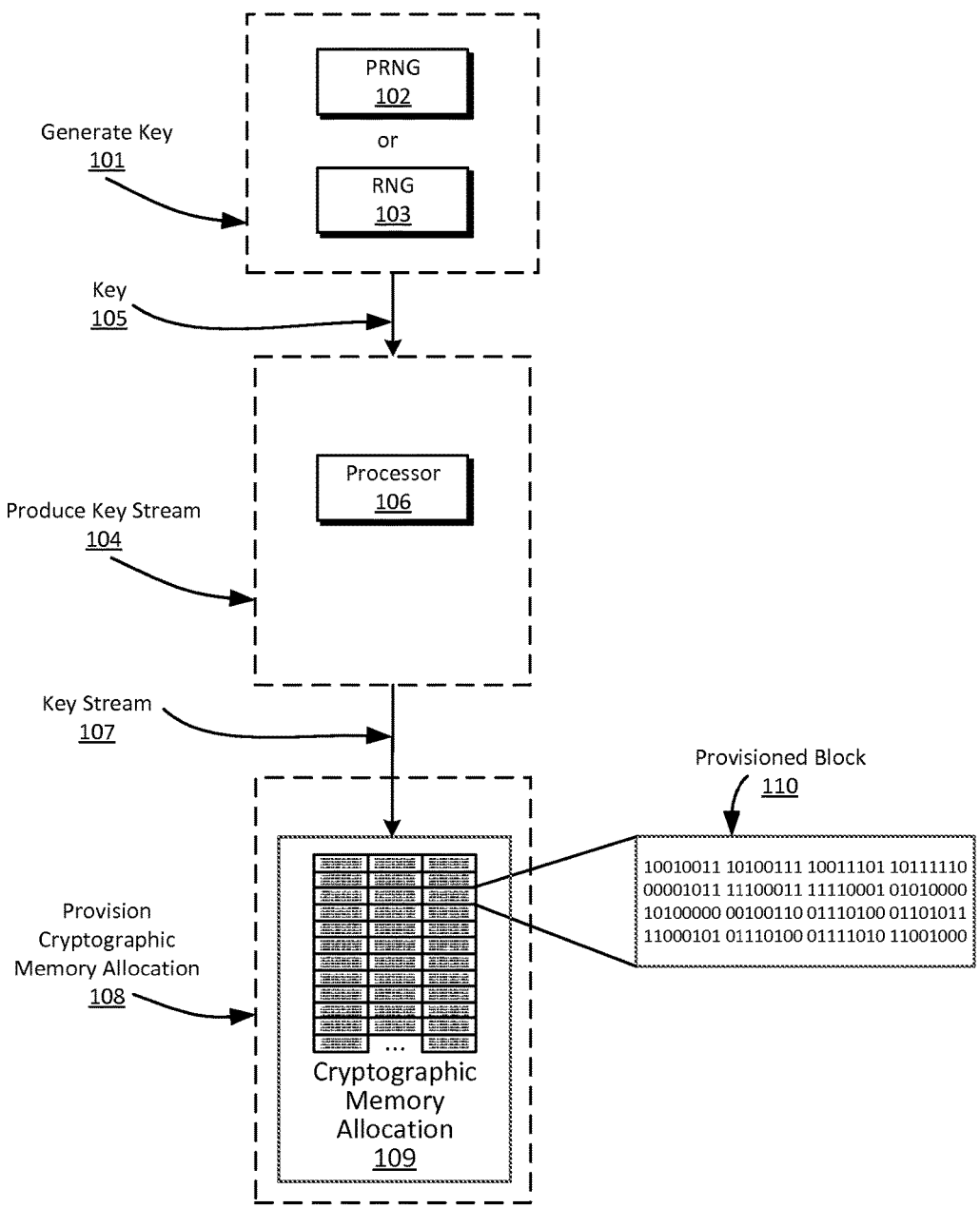
FIG. 1 is a schematic of the system performing a provision operation.

FIG. 1 illustrates the provision method of the invention where during the provision operation processor cycles in a computing system are used in order to generate a keystream and write the keystream to a cryptographic memory allocation (CMA). A cryptographic memory allocation can be of arbitrary size which is usually dictated by operating system constraints and demand for memory. For the purpose of illustration, we will present a method using a single processor core for keystream generation with the understanding that multiple cores can be utilized to generate multiple partitions of the keystream in parallel. FIG. 1 also illustrates the keying component of the provision method in order to key the symmetric-key algorithm that is being utilized.

Generate Key 101 uses a Pseudorandom Number Generator (PRNG) 102 or Random Number Generator (RNG) 103 to generate Key 105 for use with AES in Provision Cryptographic Memory Allocation 108 as illustrated by the pseudo code in Table I. For best practices concerning pseudorandom number generation, see [4].

More specifically let $k_i$=RNG be the generation of a 256-bit symmetric key using a cryptographically secure random or pseudorandom number generator. We can generate a key set composed of n 256-bit keys $k_1, k_2, \ldots k_n$ by sequentially calling the random or pseudorandom number generator.

TABLE I

For i = 1 to n
   $k_i$ = RNG( )
EndFor

Provision Cryptographic Memory Allocation 108 uses Key 105 provided by Generate Key 101 to key AES and operate Produce Key Stream 104 of which is written sequentially to Cryptographic Memory Allocation 109, using cycles from Processor 106 as illustrated in Table II.

More specifically, let M be defined as Cryptographic Memory Allocation 109 with a capacity of m 128-bit blocks where a keystream of length j 128-bit blocks will be stored. Let $M_i=E_k(N\|i)$ for i=1 . . . j be defined as the 128-bit value written to each memory location $M_i$ where $E_k$ is the encryption function of AES using a 256-bit key k previously generated in Generate Key 101, N is a 96-bit psuedorandom nonce, and i is a 32-bit counter incremented for the generation of each block with j<=m. The result of this computation is written to Cryptographic Memory Allocation 109 in the form of Provisioned Block 110.

TABLE II

Figure 2:
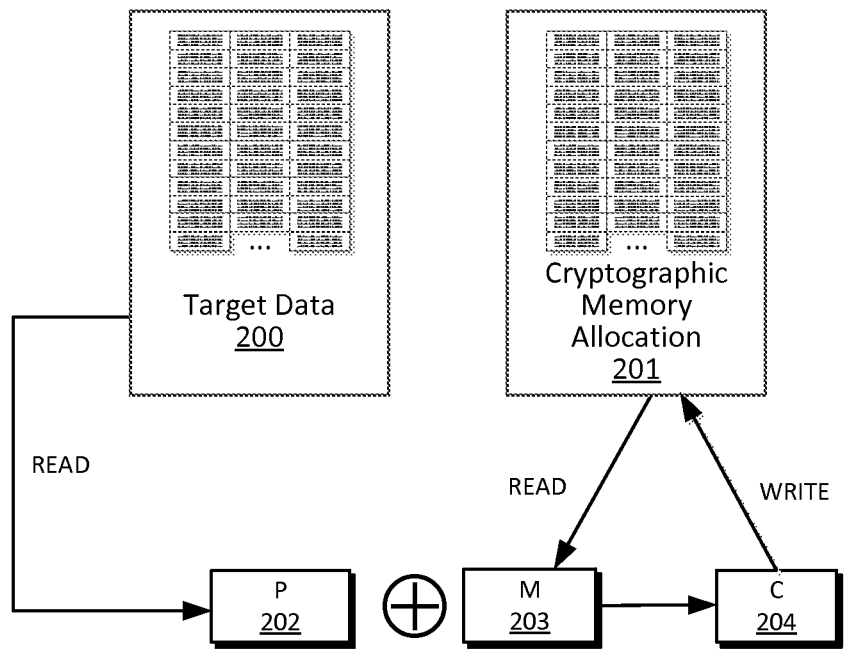
FIG. 2 is a schematic of the system performing a plaintext store operation.

While(MoreSpaceToProvision( ))
   For i = 1 to j
      $M_i$ = $E_k$ (N ∥ i)
      ProvisionCMABlock($M_i$)
   EndFor
End While FIG. 2 illustrates the store plaintext method according to an embodiment of the present invention. We will assume a Target Data 200 and a previously formatted Cryptographic Memory Allocation 201 are available in memory. Each block of data is encoded using a corresponding block read from the Cryptographic Memory Allocation 201 that was generated according to the method outlined in FIG. 1. This process of encoding is illustrated in Table III.

More specifically let $P_1, P_2, \ldots P_n$ or P 202 represent a plaintext of n 128-bit blocks and j be the number of 128-bit blocks of Cryptographic Memory Allocation 201 available in memory. Let the instructions executed for encoding each plaintext block $P_i$ be defined as $C_i=P_i \oplus M_i$, i<=j. Let $C_1, C_2, \ldots C_n$ or C 204 represent the resulting ciphertext of n 128-bit blocks where M 203 is a preformatted block.

TABLE III

For i = 1 to n
   $P_i$ = GetPlaintextBlock($D_i$)
   $C_i$ = $P_i$ ⊕ CMABlock$_i$
   WriteBackCMABlock($C_i$)
EndFor It should be noted that each encoded block C 204 written to Cryptographic Memory Allocation 201 resides in the same location as the original block M 203 present from the provision operation. In this manner no additional space is required for the operation as a whole.

Figure 3:
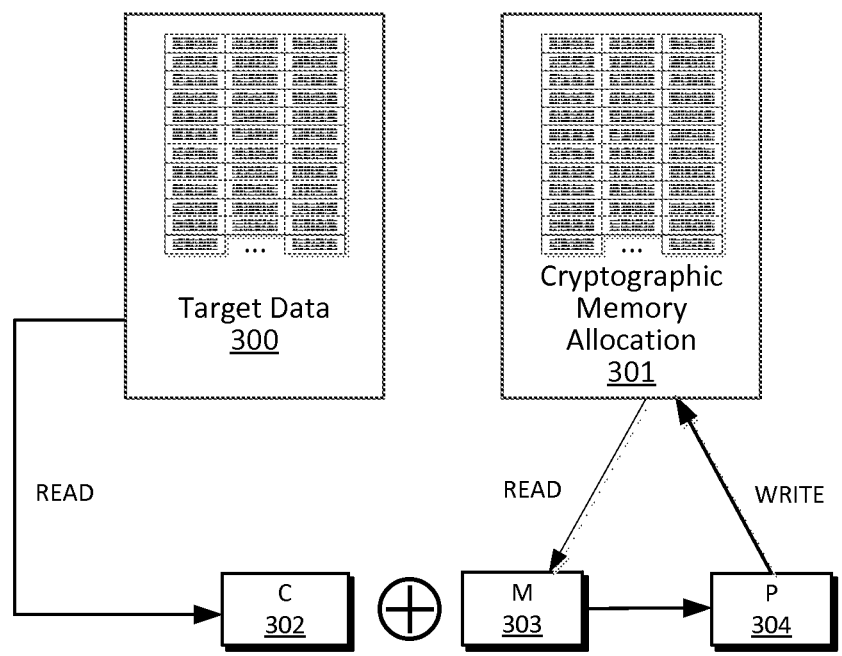
FIG. 3 is a schematic of the system performing a ciphertext store operation.

FIG. 3 illustrates the store ciphertext method according to an embodiment of the present invention. We will assume a Target Data 300 and a previously formatted Cryptographic Memory Allocation 301 are available in memory. Each block of data is decoded using a corresponding block read from the Cryptographic Memory Allocation 301 that was generated according to the method outlined in FIG. 1. This process of encoding is illustrated in Table IV.

More specifically let $C_1, C_2, \ldots C_n$ or C 302 represent a ciphertext of n 128-bit blocks and j be the number of 128-bit blocks of Cryptographic Memory Allocation 301 available in memory. Let the instructions executed for decoding each plaintext block $P_i$ be defined as $P_i=C_i \oplus M_i$, i<=j. Let $P_1, P_2, \ldots P_n$ or P 304 represent the resulting plaintext of n 128-bit blocks where M 303 is a preformatted block.

TABLE IV

For i = 1 to n
   $C_i$ = GetCiphertextBlock($D_i$)
   $P_i$ = $C_i$ ⊕ CMABlock$_i$
   WriteBackCMABlock($P_i$)
EndFor It should be noted that each decoded block P 304 written to Cryptographic Memory Allocation 301 resides in the same location as the original block M 303 present from the provision operation. In this manner no additional space is required for the operation as a whole.

For the details concerning the options for generating and concatenating counter and nonce values for a specific key see "Recommendation for Block Cipher Modes of Operation: Methods and Techniques" [5]. Also note that only the encryption function of the symmetric-key algorithm is needed when operating in CTR or GCM mode.

Figure 4:
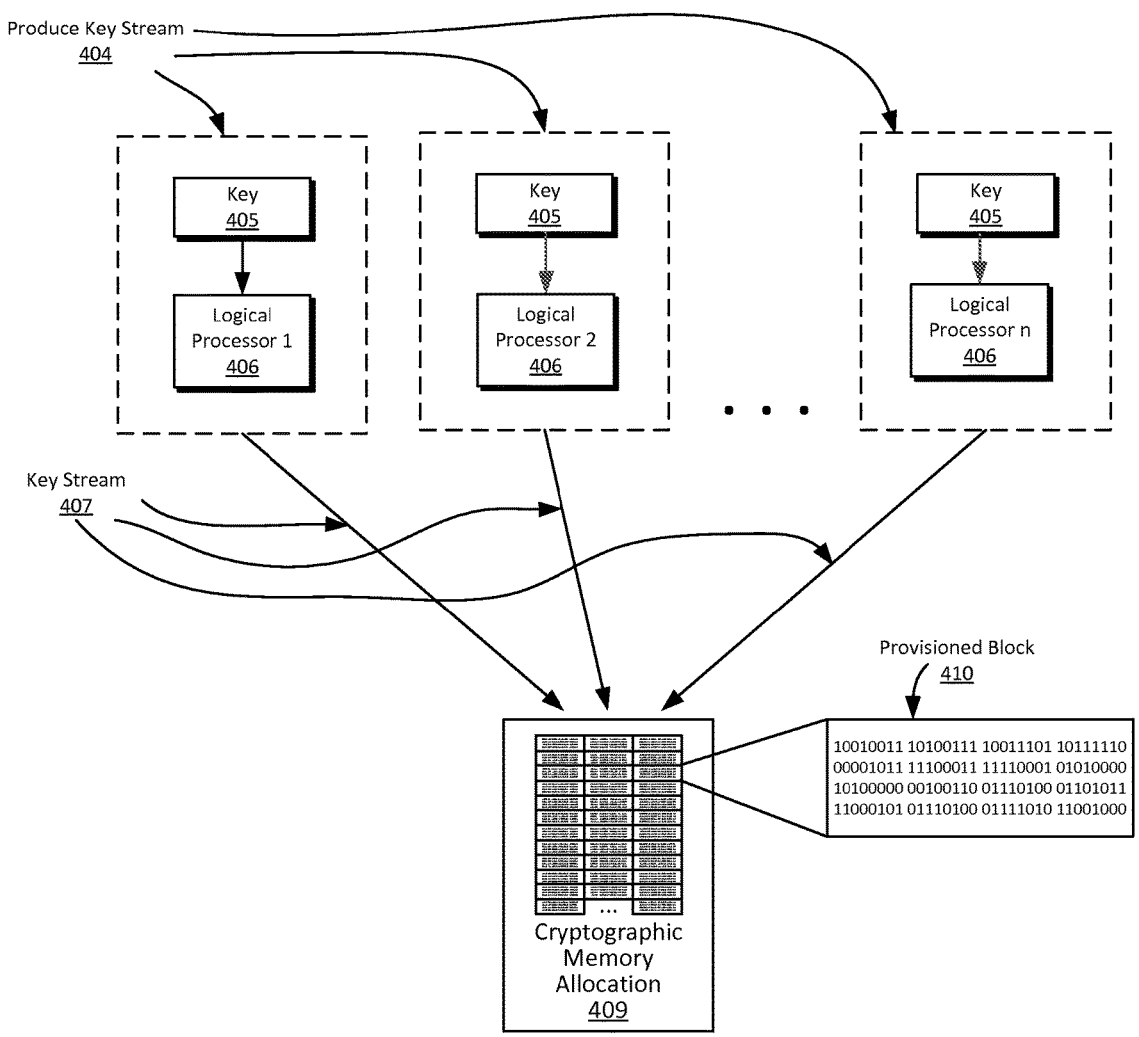
FIG. 4 is a schematic of the system performing a provision operation using parallel processing.

FIG. 4 illustrates the method of using arbitrary parallelism while performing the provision method according to an embodiment of the present invention. For the purpose of illustration we will define a logical processor as a thread of execution that is capable of performing instructions on a data stream independent of the logical or physical implementation of multiprocessing specific to that system.

Multiprocessor capability can be presented to the invention through multiple physical processors, processor cores, or a processor or operating system threading mechanism. The method of parallelization we will present is based on the simple structure of dividing Cryptographic Memory Allocation 409 into multiple sequential partitions and operating on those partitions in parallel.

A Cryptographic Memory Allocation 409 is divided up into n partitions which each serve as input to n Logical Processors 406. Each Logical Processor 406 is responsible for provisioning a partition of Cryptographic Memory Allocation 409 as illustrated in Table V. More specifically let $V_1$, $V_2$, ..., $V_n$ be a set of n Cryptographic Memory Allocation 409 partitions. Let $L_1$, $L_2$, ..., $L_n$ represent n logical processors. Each logical processor $L_k$ generates a corresponding partition of keystream using Produce Key Stream 404 and stores it to Cryptographic Memory Allocation 409 partition $V_k$. Let M be defined as Cryptographic Memory Allocation 409 partition with a capacity of m 128-bit blocks where a Key Stream 407 of length j 128-bit blocks will be stored. Let $M_i = E_k(N||i)$ for i=1...j be defined as the 128-bit value written to each memory location $M_i$ where $E_k$ is the encryption function of AES using a 256-bit Key 405 generated as illustrated in FIG. 1 Generate Key 101, N is a 96-bit psuedorandom nonce, and i is a 32-bit counter incremented for the generation of each block with j<=m in the form of Provisioned Block 410.

TABLE V

ForEach Logical Processor k = 1 to n
  While($V_i$ = MoreSpaceToProvision($L_k$))
    For i = 1 to j
      $M_i$ = $E_k$ (N || i)
      ProvisionCMABlock($V_i$, $L_k$, $M_i$)
    EndFor
  End While
EndFor The degree of parallel operation the invention is able to create is defined by the number of logical processors available for generating the key stream used to provision Cryptographic Memory Allocation 409. The maximum theoretical speedup can be defined as i/n where i is the symmetric-key algorithm encoding rate and n is the number of logical processors. The actual speedup will depend on the architecture of the computing system executing the algorithm based on its ability to cache data from multiple memory streams and other hardware specific issues when executing parallel operations.

It should be noted that when using the invention the actual encoding performed by the system is mathematically equivalent to encoding performed by a system that is not using the invention. Therefore, if data is written to the invention it can be read from the invention and decoded without the inventions read method since any device that has the equivalent symmetric-key algorithm and reduplication algorithm can read the data.

While certain embodiments have been described above, other embodiments will be obvious in view of the above description to those skilled in the art. For example, the invention will work with any symmetric-key block cipher such as DES or Triple-DES, in which a block cipher can be transformed into a stream cipher using certain modes of operation such as CTR (counter) mode, OFB (output feedback) mode, and CFB (cipher feedback) mode. It should be understood that the invention could be practiced with modification and alteration within the spirit and scope of the appended claims. The description above is not intended to be exhaustive or to limit the invention to the precise form disclosed. It should be understood that the invention can be practiced with modification and alteration and that the invention be limited only by the claims and the equivalents thereof.

REFERENCES CITED

U.S. Patent Documents

US2007/0110225 A1 "Method and apparatus for efficient encryption", Leventhal et al, Ser. No. 11/281,138, Nov. 16, 2005

US2014/0157005 A1 "Method and apparatus for a secure and deduplicated write once read many virtual disk", Leventhal et al, U.S. Ser. No. 13/866,257, Apr. 19, 2013

OTHER PUBLICATIONS

1. "End-to-end arguments in system design.", Saltzer, J., Reed, D., and Clark, D. D. 1984., ACM Transactions on. Computer Systems, Vol. 2, No. 4, November, pp. 277-288.
2. "Advanced Encryption Standard", NIST PUB 197, National Institute of Standards and Technology, November 2001.
3. "The End-to-End Argument and Application Design: the Role of Trust.", Clark, D. D., Blumenthal, M. S., Federal Communications Law Journal, vol. 63, No. 2, pp. 357-390, 2011.
4. "Recommendation for Random Number Generation Using Deterministic Random Bit Generators (Revised)", NIST SP 800-90, National Institute of Standards and Technology, March 2007.
5. "Recommendation for Block Cipher Modes of Operation: Methods and Techniques", NIST SP 800-38A, National Institute of Standards and Technology, December 2001.

What is claimed is:

1. A cryptographic resource management system comprising: a keying operation where a random number is generated and used to key a symmetric-key algorithm: and a provision operation where each byte of a cryptographic memory allocation is initialized with consecutive values from a keystream computed using a symmetric-key algorithm in a counter based block cipher mode; and a store plaintext operation where bytes are encoded using keystream values from a previous provision operation before being written to a memory allocation: and each byte written to a memory allocation replaces the corresponding keystream byte which was used to encode by writing encoded byte to the same location on said memory allocation: and a store ciphertext operation where bytes are decoded using keystream values from a previous provision operation before being written to a memory allocation: and each byte written to a memory allocation replaces the corresponding keystream byte which was used to decode by writing decoded byte to the same location on said memory allocation;

wherein the keying operation, the store plaintext operation, and the store ciphertext operation are executed by a physical processor coupled to the memory.

2. The system of claim 1, wherein cryptographic memory allocation means a set of bytes physically located in a processor cache or random access memory.

3. The system of claim 1, wherein cryptographic memory allocation means a set of bytes physically located on a solid-state memory device.

4. The system of claim 1, wherein block cipher mode means a symmetric-key algorithm operating in counter mode or an authenticated mode that can operate in parallel.

5. The system of claim 1, wherein a random number is generated using a hardware based random number generator.

6. The system of claim 1, wherein a random number is generated using a software based pseudorandom number generator.

7. The system of claim 1, wherein symmetric-key algorithm means the Advanced Encryption Standard operating in counter mode an authenticated mode that can operate in parallel.

8. The system of claim 1, wherein symmetric-key algorithm means an arbitrary symmetric-key algorithm operating in counter mode an authenticated mode that can operate in parallel.

9. The system of claim 1, wherein said keystream is computed using multiple processors, multiple cores on a single processor, multiple cores on multiple processors in parallel, or on a device designed to perform the operation.

10. The system of claim 1, wherein encoded means each byte of data is combined with a corresponding byte of keystream using an exclusive or operation.

11. The system of claim 1, wherein decoded means each byte of data is combined with a corresponding byte of keystream using an exclusive or operation.

* * * * *